(12) United States Patent
Weber

(10) Patent No.: US 8,340,196 B2
(45) Date of Patent: Dec. 25, 2012

(54) VIDEO MOTION MENU GENERATION IN A LOW MEMORY ENVIRONMENT

(75) Inventor: Laszlo Weber, Milpitas, CA (US)

(73) Assignee: LSI Corporation, Milpitas, CA (US)

( * ) Notice: Subject to any disclaimer, the term of this patent is extended or adjusted under 35 U.S.C. 154(b) by 1488 days.

(21) Appl. No.: 11/749,809

(22) Filed: May 17, 2007

(65) Prior Publication Data
US 2008/0285949 A1 Nov. 20, 2008

(51) Int. Cl.
*H04N 7/12* (2006.01)
(52) U.S. Cl. .................................. 375/240.26
(58) Field of Classification Search ............. 375/240.01, 375/240.26; 715/716–723, 731, 810; 717/100; 386/200; *H04N 7/12*
See application file for complete search history.

(56) References Cited

U.S. PATENT DOCUMENTS

| | | | |
|---|---|---|---|
| 2001/0019336 A1 | 9/2001 | Gordon et al. | 345/719 |
| 2004/0128317 A1 | 7/2004 | Sull et al. | 707/104.1 |
| 2005/0278634 A1 | 12/2005 | Chen et al. | 715/723 |
| 2005/0289466 A1 | 12/2005 | Chen | 715/731 |
| 2006/0048056 A1 | 3/2006 | Huang | 715/719 |
| 2006/0230427 A1 | 10/2006 | Kunkel et al. | 725/133 |

FOREIGN PATENT DOCUMENTS

GB 2339989 A 2/2000
WO WO 2007/015047 A2 2/2007

*Primary Examiner* — Young Lee
(74) *Attorney, Agent, or Firm* — Christopher P. Maiorana, PC

(57) ABSTRACT

A method of generating a motion menu in a low memory environment. The method generally includes the steps of (A) generating a plurality of encoded streams in a buffer by encoding a fixed duration from each of a plurality of title streams received in a video program, (B) generating a plurality of thumbnails frames in the buffer by decoding each of the encoded streams and (C) generating the motion menu in the buffer by combining one of the thumbnail frames from each respective one of the encoded streams into a respective one of plurality of menu frames such that a sequential display the menu frames appears as a plurality of thumbnails having dynamic content in the motion menu.

20 Claims, 5 Drawing Sheets

`US 8,340,196 B2`

VIDEO MOTION MENU GENERATION IN A LOW MEMORY ENVIRONMENT

FIELD OF THE INVENTION

The present invention relates to video menu creation generally and, more particularly, to video motion menu generation in a low memory environment.

BACKGROUND OF THE INVENTION

Referring to FIG. 1, a diagram of a conventional Digital Versatile Disk (DVD) menu page 10 is shown. The menu page 10 includes a background image 12, several thumbnail pictures 14a-14f and one or more navigation buttons 16a-16b. The DVD menu page 10 is commonly the first picture to appear when playing a DVD disk on a commercial player/recorder.

The image 12 is often stored in a nonvolatile memory within the player/recorder. The image 12 is used to create a visual background template for the thumbnail pictures 14a-14f. Usually, 4 to 8 thumbnail pictures 14a-14f are in a single menu page 10, one thumbnail picture 14a-14f for each title of a video program. If the number of titles in the program exceeds the thumbnail capacity of the menu 10, the menu 10 has several pages and thus is called a multi-page menu. The buttons 16a-16b control movement between menu pages. The buttons 16a-16b are commonly named NEXT and PREVIOUS.

Menu navigation is triggered by a hand-held remote control unit associated with the player/recorder. By pressing the arrow keys on the remote control, a central focus on a display can be moved either to any of the thumbnail pictures 14a-14f or to any of the buttons 16a-16b. By activating the selected object, the player/recorder either plays the selected title or executes the button to change the menu page 10 to either the next page or the previous page, as appropriate.

SUMMARY OF THE INVENTION

The present invention concerns a method of generating a motion menu in a low memory environment. The method generally comprises the steps of (A) generating a plurality of encoded streams in a buffer by encoding a fixed duration from each of a plurality of title streams received in a video program, (B) generating a plurality of thumbnails frames in the buffer by decoding each of the encoded streams and (C) generating the motion menu in the buffer by combining one of the thumbnail frames from each respective one of the encoded streams into a respective one of plurality of menu frames such that a sequential display the menu frames appear as a plurality of thumbnails having dynamic content in the motion menu.

The objects, features and advantages of the present invention include providing video motion menu generation in a low memory environment that may (i) generate thumbnails showing moving sequences in a menu, (ii) create the dynamic thumbnails using a small amount of memory and/or (iii) create a motion menu without use of storage external to a player/recorder.

BRIEF DESCRIPTION OF THE DRAWING

These and other objects, features and advantages of the present invention will be apparent from the following detailed description and the appended claims and drawings in which:

DETAILED DESCRIPTION OF THE PREFERRED EMBODIMENTS

DVD menus with static title thumbnail pictures are often available on prerecorded DVD disks. Motion menus are dynamic menus where individual title thumbnail images change over time to show a moving sequence. The motion menus are generally not available on consumer created DVD disks and usually cannot be created in consumer DVD recorder/players. The consumer DVD recorder/players generally lack sufficient internal memory to generate the motion menus.

Figure 1:
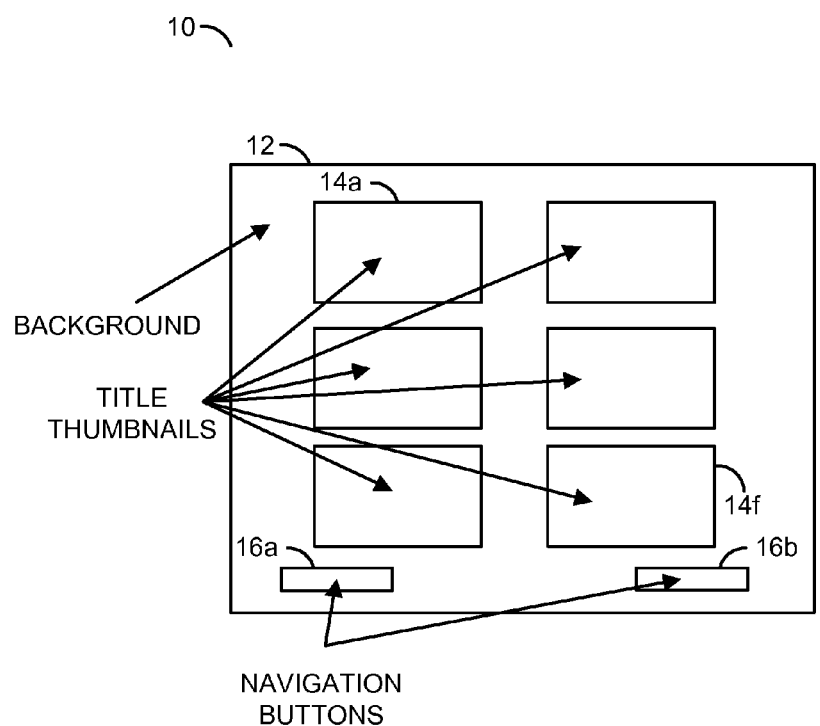
FIG. 1 is a diagram of a conventional DVD menu page.
Figure 2:
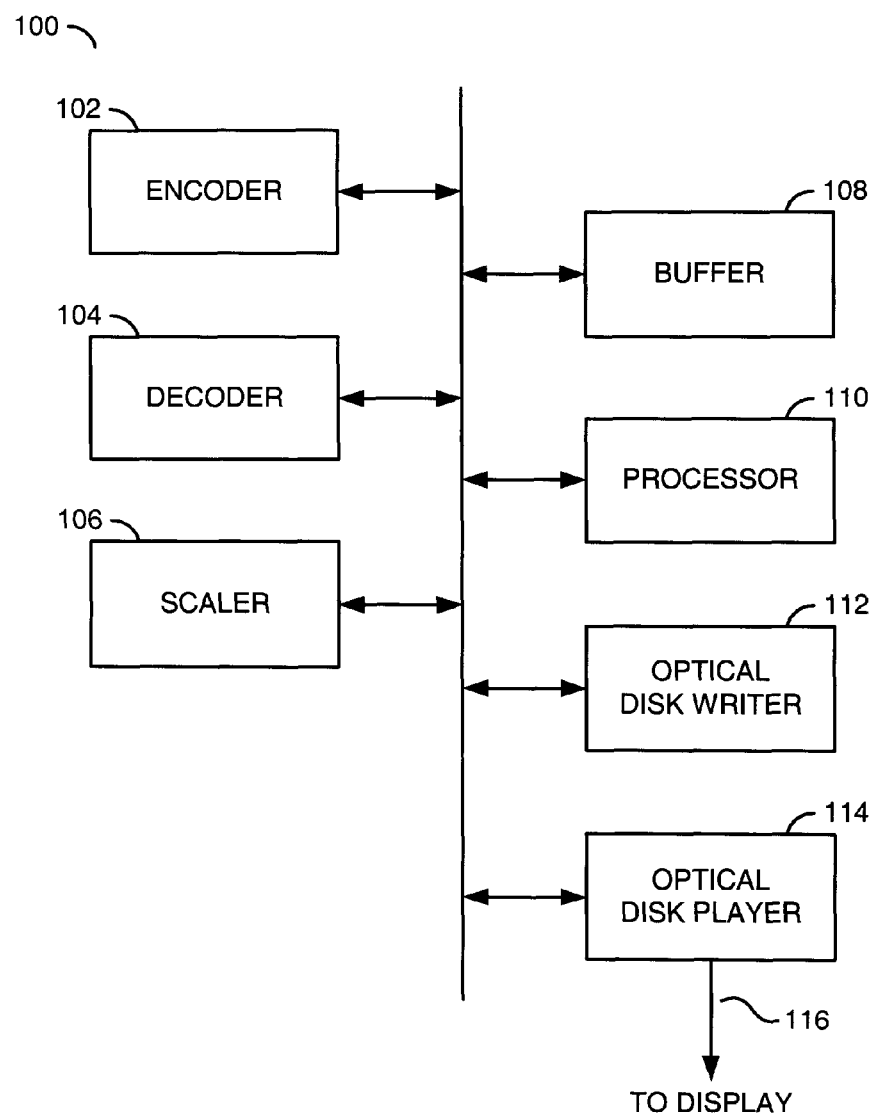
FIG. 2 is a block diagram of a device in accordance with a preferred embodiment of the present invention.

Referring to FIG. 2, a block diagram of a device 100 is shown in accordance with a preferred embodiment of the present invention. The device (or apparatus) 100 may be implemented as a DVD recorder/player. The device 100 may be operational to create dynamic thumbnail pictures in a motion menu using title video streams received from a video source. The device 100 generally comprises a circuit (or module) 102, a circuit (or module) 104, a circuit (or module) 106, a circuit (or module) 108, a circuit (or module) 110, a circuit (or module) 112, a circuit (or module) 114 and an interface (or port) 116.

The circuit 102 may implement an audio/video encoder. The circuit 102 is generally operational to encode video streams to generate encoded bitstreams. Encoding may be compliant with the MPEG-2 standard, the MPEG-4 standard, the MPEG-4 Advance Video Coding recommendation and/or the H.264 recommendation. Other video encoding standards may be implemented to meet the criteria of a particular application.

The circuit 104 may implement an audio/video decoder. The circuit 104 may be operational to decode video streams to generate sequences of uncompressed frames and/or fields. Decoding may be compliant with MPEG-2 standard, the MPEG-4 standard, the MPEG-4 Advance Video Coding recommendation and/or the H.264 recommendation. Other video decoding standards may be implemented to meet the criteria of a particular application.

The circuit 106 may implement a video scaler. The circuit 106 is generally operational to downscale video fields/frames of a video stream in real time. Downscaling may alter a size of a video field/frame from a normal size (e.g., 720 by 480 pixels) to a thumbnail size (e.g., 120 by 80 pixels). The downscaling may also reduce the bitrate of the video stream from approximately 4 megabits per second down to approximately 110 kilobits per second (e.g., in a 3×3 thumbnail array on the motion menu).

The circuit 108 may be implemented as a video memory. The circuit 108 may be configured as multiple buffers to store one or more encoded bitstreams and/or one or more decoded video sequences. The circuit 108 may be implemented as a solid-state memory. Generally, the circuit 108 has a capacity of approximately 2 megabytes (MB) to approximately 64 MB. The circuit 108 may implement a volatile random access memory. The circuit 108 may also represent a nonvolatile capability (e.g., a volatile memory and a nonvolatile memory). Other memory capacities may be implemented to meet the criteria of a particular application.

The circuit 110 may be implemented as a video processor. The circuit 110 is generally operational to manipulate video pictures and information. In some embodiments, the circuit 110 may be configured to (i) overlay decoded thumbnail frames onto a decoded background picture to form a motion menu and (ii) add navigational features (e.g., button and links) to the motion menu.

The circuit 112 may be implemented as an optical disk writer (or recorder). The circuit 112 is generally operational to write one or more encoded video programs and one or more encoded motion menus on (in) an optical disk medium. In some embodiments, the circuit 112 may also implement an optical disk players capable of reading encoded video content and encoded motion menus from an optical disk.

The circuit 114 may be implemented as an optical disk player. The circuit 114 may provide a source of the video program having the title streams used to build the motion menu. In some embodiments, the circuit 114 may be a non-optical disk source of the video program. For example, the circuit 114 may be implemented as a video satellite receiver, a cable set-top-box and/or a camcorder; Other sources of video programs (content) may be implemented to meet the criteria of a particular application.

The interface 116 generally implements a video output port. The interface 116 may be arranged as one or more of a composite output, a component output, a radio-frequency output, a red-green-blue output and/or the like. The interface 116 may be connectable to a display to show the programs and the motion menus to viewers.

Figure 3:
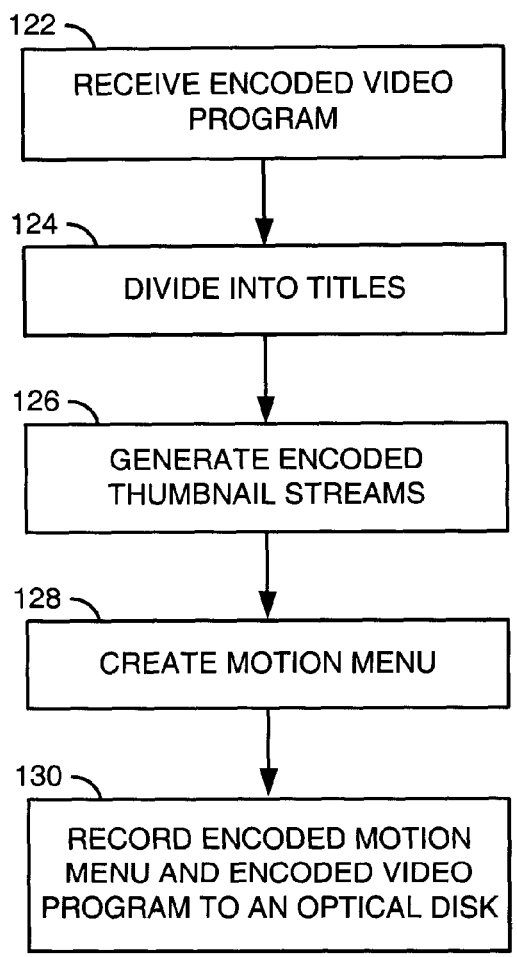
FIG. 3 is a flow diagram of an example method of generating a motion menu.

Referring to FIG. 3, a flow diagram of an example method 120 of generating a motion menu is shown. The method (or process) 120 may be implemented by the device 100. The method 120 generally comprises a step (or block) 122, a step (or block) 124, a step (or block) 126, a step (or block) 128 and a step (or block) 130.

In the step 122, a video program may be received by the circuit 114 (e.g., in the form of a normal DVD disk inserted into the player). The circuit 114 may extract one or more title streams from the video program in the step 124. Decoding of the title streams during extraction may be performed by the circuit 114 or the circuit 104. Stream segments covering a fixed amount of time (e.g., 20 to 30 second) of each of the title streams may be read from the circuit 114 for further processing. In the step 126, the circuit 102 may encode the captured title stream segments and store the encoded title stream segments in the circuit 108. Buffering of the segments may be done after encoding to make efficient use of the limited capacity of the circuit 108.

In the step 128, the circuits 102-110 may operate to create a motion menu from the encoded title stream segments. Generation of the motion menu generally includes adding intra-menu navigation features (e.g., next page and previous page buttons) and DVD related navigation features (e.g., language selection, aspect ratios and such). The resulting motion menu may be encoded by the circuit 102 and temporarily stored in the circuit 108 for subsequent display and/or recording. In the step 130, the circuits 104-112 may operate to store both the motion menu and the video program on (in) a writable medium (e.g., an optical disk) mounted in the circuit 112. The method 120 may be repeated for each page of the motion menu.

Figure 4:
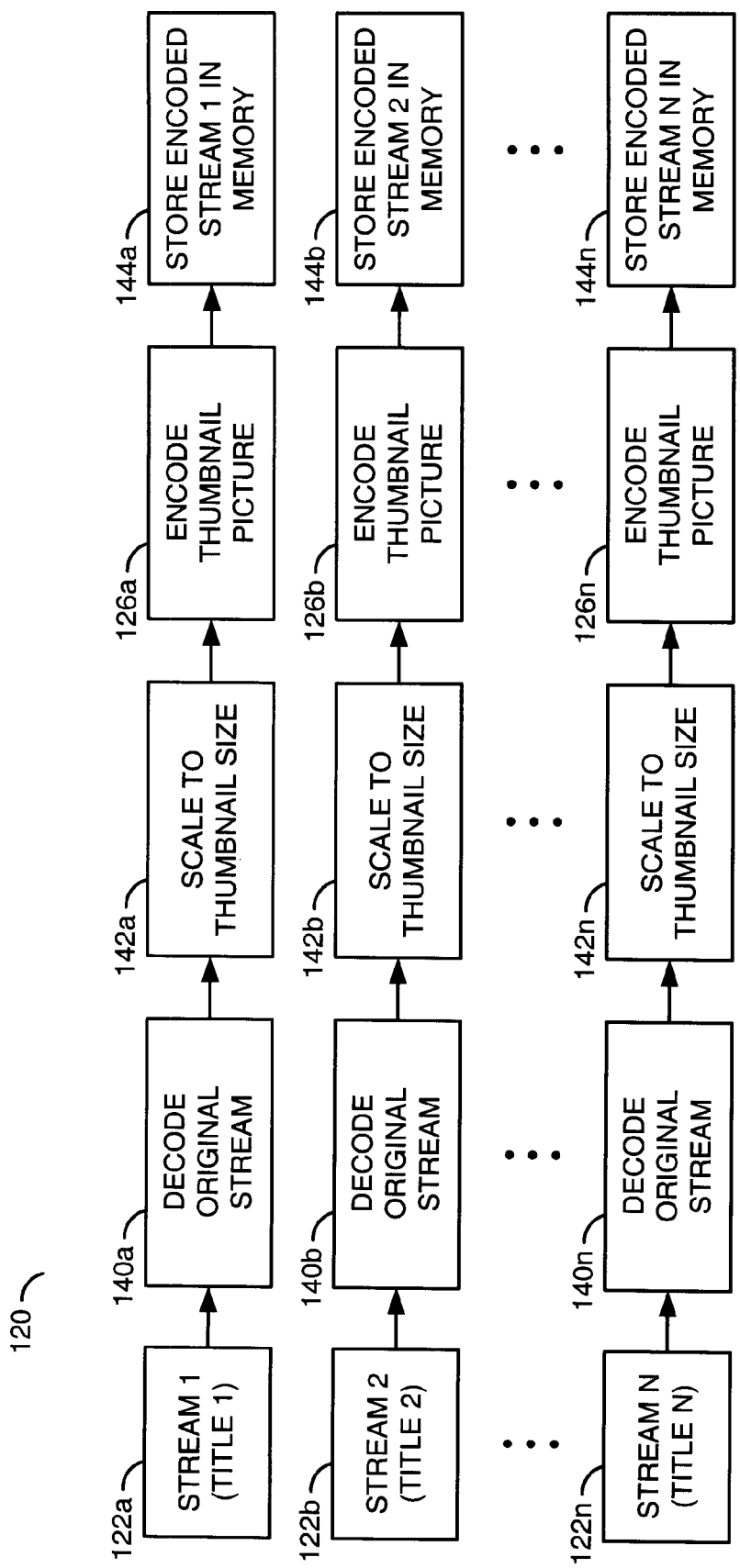
FIG. 4 is a detailed flow diagram of a portion of the method of FIG. 3 focused on creating thumbnail streams.

Referring to FIG. 4, a detailed flow diagram of a portion of the method 120 focused on creating the thumbnail streams is shown. The illustrated portion may include the step 122, one or more steps (or blocks) 140a-140n, one or more steps (or blocks) 142a-142n, the step 126 and one or more steps (or blocks) 144a-144n.

The step 122 (in FIG. 3) generally comprises multiple sub-steps 122a-122n (in FIG. 4), one sub-step for each of the title streams (e.g., STREAM 1 to STREAM N) received from the circuit 114. In some embodiments, the title streams may be received from the circuit 114 one at a time and processed one at a time. In other embodiments, two or more of the title streams may be received and processed in parallel. The title streams may be received in an encoded form.

In the steps 140a-140n, each of the encoded title streams may be decoded by either the circuit 104 and/or the circuit 114. Similar to the steps 122a-122n, the decoding operations 140a-140n may be performed sequentially, one title stream at a time, or in parallel with two or more streams substantially simultaneously. Decoding may be performed on a frame-by-frame basis and/or a field-by-field basis. The decoded title streams may be temporarily buffered in the circuit 108. In the steps 142a-142n, the decoded title streams may be down-scaled to a thumbnail size by the circuit 106. Scaling may be performed on a frame-by-frame and/or field-by-field basis. The thumbnail size may be a fixed size or a dynamic size, depending on one or both of (i) the number of titles to be presented on each page of the motion menu and (ii) the size of the motion menu. Each of the scaled thumbnail streams may be buffered in the circuit 108. In some embodiments, the scaled thumbnail streams may overwrite the original title streams. In other embodiments, the scaled thumbnail streams may be stored separately from the original title streams.

The step 126 (in FIG. 3) generally comprises multiple sub-steps 126a-126n (in FIG. 4), one sub-step for each of the scaled thumbnail streams. In each of the steps 126a-126n, a respective scaled thumbnail stream may be encoded. The resulting thumbnail streams may be stored on (in) the circuit 108 in the steps 144a-144n.

Figure 5:
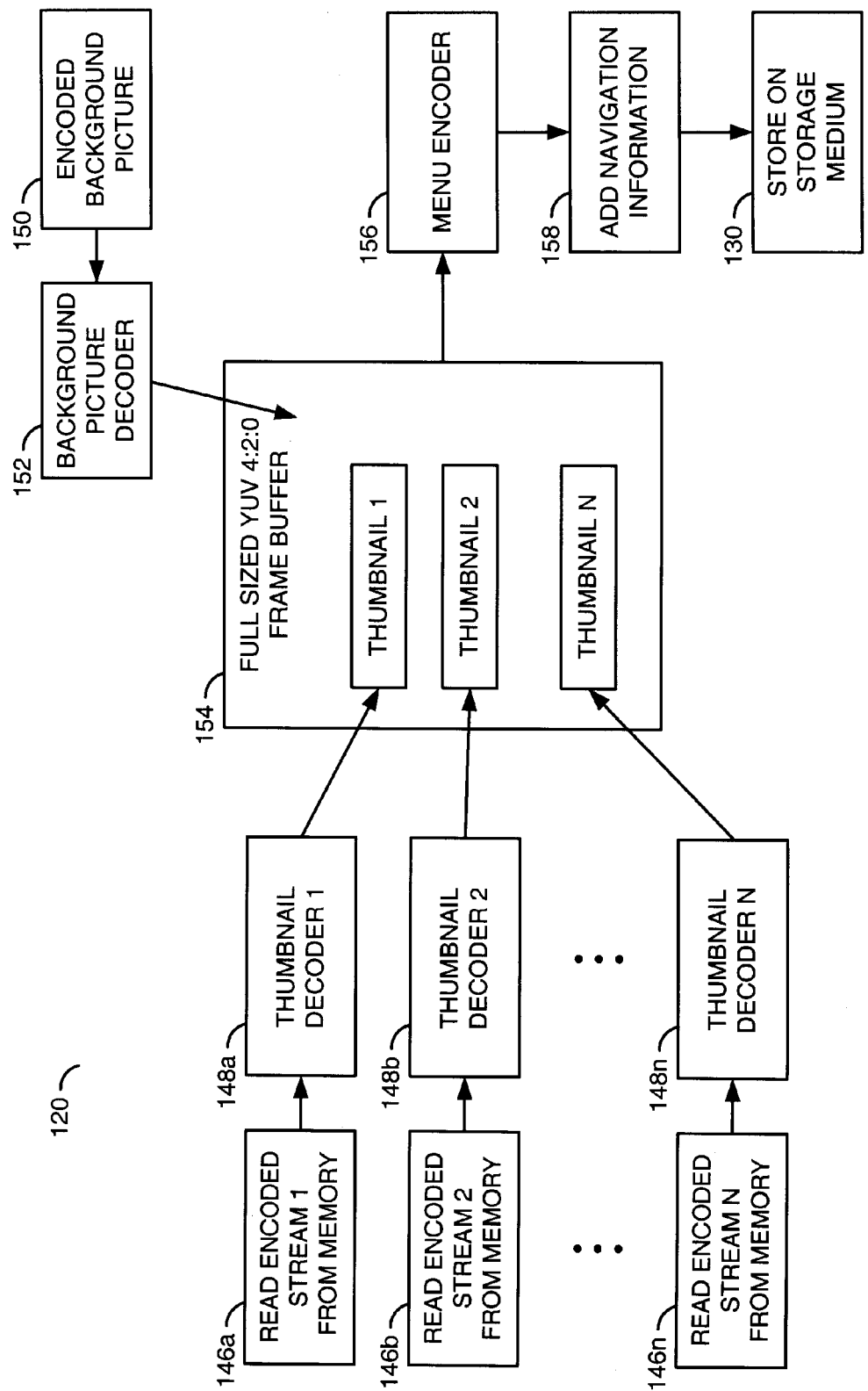
FIG. 5 is a detailed flow diagram of a portion of the method of FIG. 3 focused on completing the motion menu.

Referring to FIG. 5, a detailed flow diagram of a portion of the method 120 focused on completing the motion menu is shown. The illustrated portion may include one or more steps (or blocks) 146a-146n, one or more steps (or blocks) 148a-148n, a step (or block) 150, a step (or block) 152, a step (or block) 154, a step (or block) 156, a step (or block) 158 and the step 130.

In the steps 146a-146n, a single field/frame of each of the encoded and scaled thumbnail streams may be read from the circuit 108. As before, reading may be performed one field/frame at a time, or multiple field/frames in parallel and substantially simultaneously. Each of the fields/frames read from the circuit 108 may be decoded in the respective steps 148a-148n by the circuit 104 and written back into the circuit 108.

In the step 150, an encoded background picture may be read by the circuit 104 from either the circuit 108 (e.g., nonvolatile portion) or the video source via the circuit 114. The background picture is generally stored in an encoded form to save space. The circuit 104 may decode the background picture in the step 152 and buffer the decoded picture in the circuit 108 (e.g., volatile portion). The decoded background picture may occupy a full size buffer (e.g., a YUV 4:2:0 buffer) in the circuit 108. In the step 154, the circuit 110 may generate a page of the motion menu by combining a thumbnail field/frame from each of the titles with the background picture. The resulting motion menu page may be buffered in the circuit 108 during and after construction. The circuit 102 may then encode the motion menu page in the step 156 and store the result back into the circuit 108.

Additional encoded motion menu pages may be created for each successive page until all of the motion menu pages have been created, encoded and buffered. In the step 158, the circuit 110 may add the onscreen navigation information to the encoded motion menu page. Thereafter, the circuit 112 may write the completed motion menu into a writable optical disk in the step 130 in a DVD-video compliant stream. The navigation information stored in navigation files may instruct a player (e.g., circuit 114) to continuously loop through the thumbnail sequences thereby creating a constantly moving motion menu. In some embodiments, the navigation files may instruct the player to display the thumbnail sequences in a single pass and then hold the thumbnails at the last fields/ frames of the sequences.

By re-encoding each of the title streams, a substantial memory saving within the device 100 may be realized. The memory savings generally makes possible the whole motion menu creating process in a local solid-state memory without using a large external storage device, such as a magnetic hard drive.

Audio may be provided while the motion menu is displayed to the viewers. For example, one or more audio clips may be stored in the circuit 108 (nonvolatile portion) and played through the circuit 110 at a low bitrate. Where multiple audio clips are stored in the circuit 108, a user authoring the motion menu may select one or more of the clips to be associated with the motion menu.

The functions performed by the diagrams of FIGS. 2-5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method of generating a motion menu, comprising the steps of:
   (A) receiving a single video program from a video source, said single video program comprising a plurality of title streams arranged sequentially;
   (B) dividing said title streams into a plurality of title segments, each one of said title segments corresponding to a respective one of said title streams and each of said title segments covering a fixed amount of time;
   (C) generating a plurality of thumbnail segments by scaling said title segments to a thumbnail size, each one of said thumbnail segments corresponding to a respective one of said title segments;
   (D) generating a plurality of encoded segments in a buffer by encoding said thumbnail segments, each one of said encoded segments corresponding to a respective one of said thumbnail segments;
   (E) generating a plurality of thumbnails frames in said buffer by decoding said encoded segments, each one of said title segments corresponding to multiple respective ones of said thumbnail frames; and
   (F) generating a plurality of menu frames of said motion menu in said buffer by combining (i) a respective one of said thumbnail frames from each respective one of said title segments and (ii) a background picture into each respective one of said menu frames such that a sequential display of said menu frames appears as a plurality of thumbnails in a foreground having dynamic content in said motion menu.

2. The method according to claim 1, further comprising the step of:
   generating an encoded menu in said buffer by encoding said motion menu.

3. The method according to claim 2, further comprising the step of:
   adding at least one navigation item to said encoded menu, wherein said navigation item implements on-screen navigation.

4. The method according to claim 2, further comprising the step of:
   recording both said encoded menu and said single video program in a recording medium.

5. The method according to claim 1, wherein at most one of said thumbnail frames from each of said title segments resides in said buffer at a time.

6. The method according to claim 5, wherein said thumbnail segments are generated by spatially downscaling each of a plurality of frames in each of said title segments.

7. The method according to claim 1, further comprising the step of:
   generating said background picture by decoding said single video program.

8. The method according to claim 7, wherein said background picture is static in said motion menu.

9. The method according to claim 1, wherein each given one of said menu frames is encoded before a subsequent one of said menu frames is generated.

10. The method according to claim 1, wherein said buffer comprises a volatile memory of no greater than 64 megabytes.

11. A device comprising:
    a buffer; and
    a circuit configured to (A) receive a single video program from a video source, said single video program comprising a plurality of title streams arranged sequentially, (B) divide said title streams into a plurality of title segments, each one of said title segments corresponding to a respective one of said title streams and each of said title segments covering a fixed amount of time, (C) generate a plurality of thumbnail segments by scaling said title segments to a thumbnail size, each one of said thumbnail segments corresponding to a respective one of said title segments, (D) generate a plurality of encoded segments in said buffer by encoding said thumbnail segments, each one of said encoded segments corresponding to a respective one of said thumbnail segments, (E) generate a plurality of thumbnails frames in said buffer by decoding said encoded segments, each one of said title segments corresponding to multiple respective ones of said thumbnail frames and (F) generate a plurality of menu frames of a motion menu in said buffer by combining (i) a respective one of said thumbnail frames from each respective one of said title segments and (ii) a background picture into each respective one of said menu frames such that a sequential display of said menu frames appears as a plurality of thumbnails in a foreground having dynamic content in said motion menu.

12. The device according to claim 11, wherein said circuit comprises an encoder configured to generate an encoded menu in said buffer by encoding said motion menu.

13. The device according to claim 12, wherein (i) said encoder is further configured to add at least one navigation item to said encoded menu and (ii) said navigation item implements on-screen navigation.

14. The device according to claim 12, wherein said circuit further comprises an optical disk writer configured to record both said encoded menu and said single video program in a recording medium.

15. The device according to claim 11, wherein at most one of said thumbnail frames from each of said title segments resides in said buffer at a time.

16. The device according to claim 15, wherein said circuit further comprises a scaler configured to generate said thumbnail frames by spatially downscale each of a plurality of frames in each of said title segments.

17. The device according to claim 11, wherein said circuit is further configured to generate said background picture by decoding said single video program.

18. The device according to claim 17, wherein said background picture is static in said motion menu.

19. The device according to claim 11, wherein each given one of said menu frames is encoded before a subsequent one of said menu frames is generated.

20. A device comprising:
means for receiving a single video program from a video source, said single video program comprising a plurality of title streams arranged sequentially;
means for dividing said title streams into a plurality of title segments, each one of said title segments corresponding to a respective one of said title streams and each of said title segments covering a fixed amount of time;
means for generating a plurality of thumbnail segments by scaling said title segments to a thumbnail size, each one of said thumbnail segments corresponding to a respective one of said title segments;
means for generating a plurality of encoded segments in a buffer by encoding said thumbnail segments, each one of said encoded segments corresponding to a respective one of said thumbnail segments;
means for generating a plurality of thumbnails frames in said buffer by decoding said encoded segments, each one of said title segments corresponding to multiple respective ones of said thumbnail frames; and
means for generating a plurality of menu frames of a motion menu in said buffer by combining (i) a respective one of said thumbnail frames from each respective one of said title segments and (ii) a background picture into each respective one of said menu frames such that a sequential display said menu frames appears as a plurality of thumbnails in a foreground having dynamic content in said motion menu.

* * * * *